US011061654B1

(12) United States Patent
Borkovic et al.

(10) Patent No.: US 11,061,654 B1
(45) Date of Patent: Jul. 13, 2021

(54) SYNCHRONIZATION OF CONCURRENT COMPUTATION ENGINES

(71) Applicant: Amazon Technologies, Inc., Seattle, WA (US)

(72) Inventors: Drazen Borkovic, Los Altos, CA (US); Jindrich Zejda, Saratoga, CA (US); Taemin Kim, Portland, OR (US); Ron Diamant, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 78 days.

(21) Appl. No.: 16/217,797

(22) Filed: Dec. 12, 2018

(51) Int. Cl.
*G06F 9/44* (2018.01)
*G06F 8/41* (2018.01)
*G06F 9/30* (2018.01)
*G06N 3/02* (2006.01)
*G06F 12/1081* (2016.01)

(52) U.S. Cl.
CPC .......... *G06F 8/458* (2013.01); *G06F 9/30087* (2013.01); *G06F 9/30101* (2013.01); *G06F 12/1081* (2013.01); *G06N 3/02* (2013.01); *G06F 2212/621* (2013.01)

(58) Field of Classification Search
CPC .. G06F 8/458; G06F 9/30087; G06F 9/30101; G06F 12/1081; G06F 2212/621; G06N 3/02
See application file for complete search history.

(56) References Cited

U.S. PATENT DOCUMENTS

| 2005/0235057 A1* | 10/2005 | Brodie | H04L 43/10 709/224 |
|---|---|---|---|
| 2011/0265068 A1* | 10/2011 | Elnozahy | G06F 8/456 717/149 |
| 2017/0235638 A1* | 8/2017 | Knauth | G06F 9/3861 710/313 |
| 2017/0337084 A1* | 11/2017 | Jayaseelan | G06F 9/5027 |

* cited by examiner

*Primary Examiner* — Chat C Do
*Assistant Examiner* — Lenin Paulino
(74) *Attorney, Agent, or Firm* — Kilpatrick Townsend & Stockton LLP

(57) ABSTRACT

Provided are systems and methods for synchronizing program code execution for a plurality of execution engines in an integrated circuit device. In some cases, the operation of one execution engine may be dependent on the operation of another execution engine. To accommodate this dependency, the instructions for the first execution engine can include a set-event instruction and the instructions for the second execution engine can include a wait-on-event instruction. The wait-on-event instruction can cause the second execution engine to wait for the first execution engine to reach the set-event instruction. In this way, the two execution engines can be synchronized around the data or resource dependency.

21 Claims, 8 Drawing Sheets

SYNCHRONIZATION OF CONCURRENT COMPUTATION ENGINES

BACKGROUND

Integrated circuit devices, such as processors, accelerators, and others, can include multiple computation engines. For example, the integrated circuit device can include parallel computation engines that are capable of performing large, multi-stage computations, such as convolutions. As another example, the integrated circuit device can include computation engines for more specific operations, such as accumulating values or performing floating point math.

The data on which the computation engines operate can be retrieved from a memory of the integrated circuit device. Results produced by the computation engines can further be written to the memory. The memory may be limited in size, due to considerations such as the available space on the chip for the memory.

BRIEF DESCRIPTION OF THE DRAWINGS

Various embodiments in accordance with the present disclosure will be described with reference to the drawings, in which.

DETAILED DESCRIPTION

Figure 1:
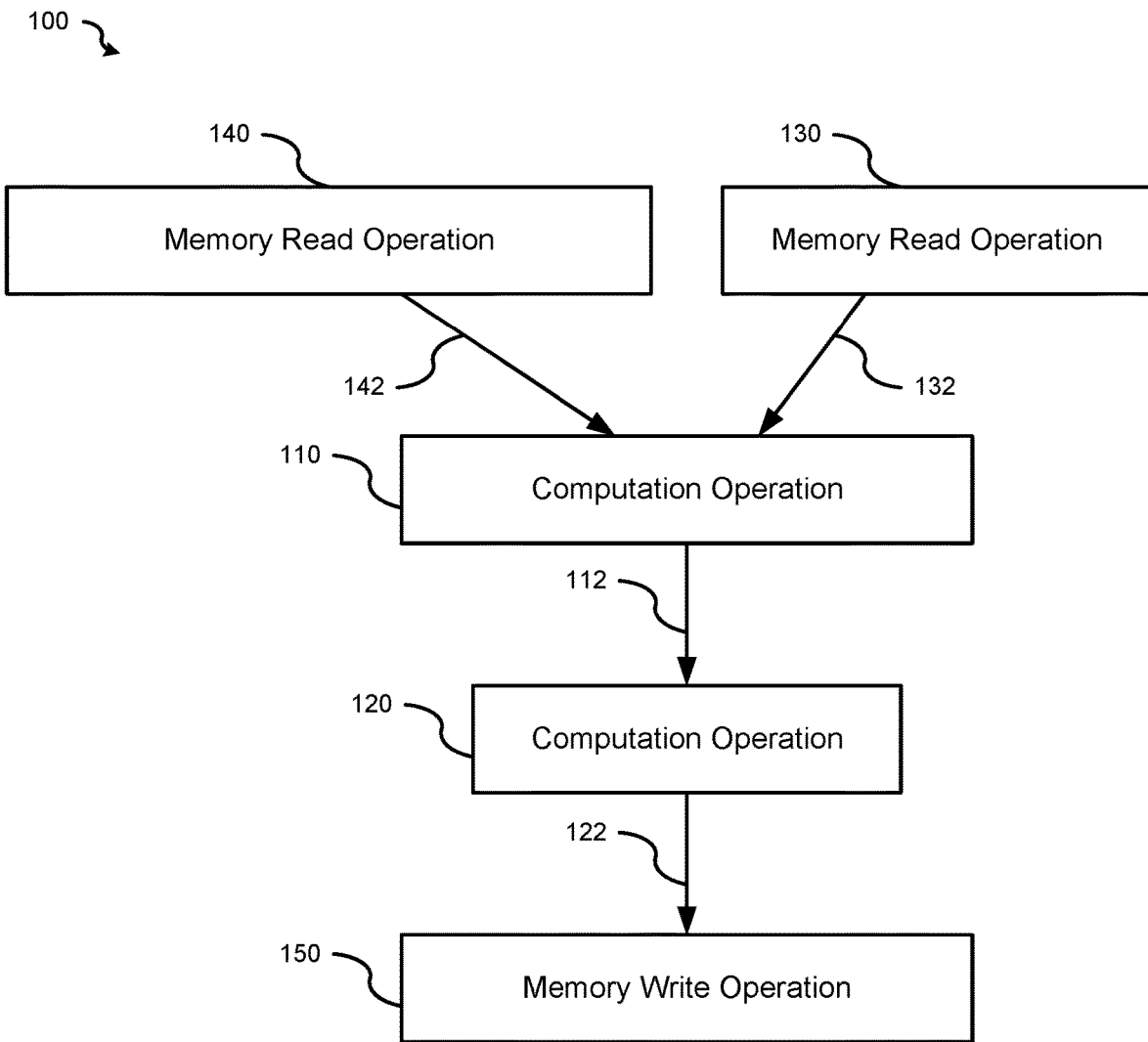
FIG. 1 is a diagram illustrating a dataflow graph with data and/or resource dependencies.

The operations of an integrated circuit device such as a processor can be directed by instructions, which can be generated for the integrated circuit device by a compiler. A compiler is a software program that transforms programs written in human-readable programming language into machine language that can be understood by the integrated circuit device. The output of a compiler can be referred to as object code, program code, or program instructions, among other examples.

When an integrated circuit device includes multiple computation engines, in various examples, the compiler for the device can produce sets of instructions for each computation engine. The instructions for a computation engine can includes steps such as reading data from memory of the device, performing a computation on the data, and writing a result of the computation back to the memory of the device. In some examples, the computation engines can independently execute respective sets of instructions, so that the computation engines can operate in parallel.

In some examples, however, the operation of one computation engine may be dependent on the operation of another computation engine. For example, a result computed by one computation engine may be needed as the input of an operation to be performed by a second computation engine. Limitations of the integrated circuit device can also cause dependencies between the computation engines. For example, the device may have a limited amount of memory or a limited number of registers in which inputs for and results from the computation engines can be stored. In this example, one computation engine may need to store a result in a memory location in which the inputs for another computation engine are stored.

When the operations of the computation engines of an integrated circuit device can have dependencies such as those described above, the compiler for the device can capture the dependencies, for example, in a dependency or dataflow graph. In a dataflow graph, nodes in the graph can represent operations or sets of operations to be performed by individual computation engines. The edges or connections between the nodes can represent dependencies between the operations at the nodes.

In some examples, the integrated circuit device can include synchronization circuitry (e.g., implementing semaphores, queues, or another type of synchronization primitive), which can be used to synchronize the computation engines around a dependency. For example, when an edge in the dataflow graph indicates a dependency between two different computation engines, the compiler can output an instruction that activates a semaphore circuit. As another example, the compiler can generate instructions that cause a first computation engine to write a result to a queue, from which a second computation engine can read the result for using in an operation. Synchronization circuits, however, may be costly in terms chip area and complexity. Use of the chip area can reduce available space for other components, such as memory, and increased complexity can increase the likelihood that the device does not operate correctly.

In various implementations, provided are systems and methods for generating instructions for an integrated circuit device. The integrated circuit device includes multiple execution engines, which may be able to operate independently but whose operations may have data and/or resource dependencies. In various examples, the techniques discussed herein can include receiving an input data set that describes the operations to be performed by the integrated circuit device. The input data can, for example, be a dataflow graph. From the input data set, a memory operation to be performed by a first execution engine can be identified, as well as an operation that is to be performed by a second execution engine and that requires that the memory operation be completed. To accommodate this dependency, the instructions for the first execution engine can include a set-event instruction and the instructions for the second execution engine can include a wait-on-event instruction. The wait-on-event instruction can cause the second execution engine to wait for the first execution engine to reach the set-event instruction. In this way, the two execution engines can be synchronized around the data or resource dependency.

In various examples, the integrated circuit device can implement events using hardware registers. In these examples, an event is set when, for example, a register contains a value of "1" and is not set when the register contains a value of "0." Hardware registers can have a small footprint on the chip die, and little circuitry is needed to write a register value or check a register value. Thus, using the techniques discussed herein, synchronization of the execution engines in the integrated circuit device can be accomplished without the integrated circuit needing specialized synchronization circuitry.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

FIG. 1 is a diagram illustrating an example dataflow graph 100. The dataflow graph 100 can be generated, for example by a compiler, and can represent sequences of operations to be performed by an integrated circuit device. The integrated circuit device can include multiple execution engines, which are also referred to herein as computation engines. Examples of types of execution engines the device can have include a computational array (also referred to herein as a an array of processing engines, a computation engine executing an activation function, a computation engine executing a pooling operation, and a direct memory access (DMA) engine, among other examples.

In various examples, each node in the data flow graph can represent an operation to be performed by a particular execution engine of the integrated circuit device. The operations can include, for example, computations and memory operations. For example, node 110 can include a computation operation to be performed by a computational array and node 120 can include a computation to be performed by a pooling engine. In some examples, the operations at node 110 and/or node 120 can require an execution engine to execute one or more instructions to complete the operation. Examples of operations that can be described at the nodes of the dataflow graph 100 include operations for specific execution engines, such as "matrix multiply," "pool," and "activate," among other examples, and operations that can be performed by any execution engine, such as "nop." Examples of memory operations include memory read operations, such as at node 140 and node 130, and memory write operations, such as at node 150. In various examples, the memory operations can be performed by different execution engines of the integrated circuit device.

In the example of FIG. 1, connections between nodes, which can also be referred to as edges, can represent data and/or resource dependencies between the nodes. A data dependency can occur, for example, when an execution engine uses the output of another execution engine as in input for a computation. A resource dependency can occur, for example, when one execution engine needs to use a memory location that second execution engine is also using. For example, the second execution may need to write a value to the memory location, and the first execution engine may need to read the value and use the value in a computation. As another example, the second execution engine may be reading or writing a value to a memory location, and the first execution engine may (due, for example, to limited memory being available) need to write a value to the same memory location.

In various examples, each node in the graph 100 includes at least one input edge, representing inputs to the operation being performed at the node, or at least one output edge, representing an output of the operation performed at the node. For example, edge 142 from node 140 and edge 132 from node 130 each indicate that the results from the operations of node 140 and node 130 are inputs to node 110. As a further example, edge 112 from node 110 to node 120 indicates that the result of the operation of node 110 is the input to the operation of node 120. As a further example, the edge 122 from node 120 to node 150 indicates that the result of the operation at node 120 is the input to the operation at node 150.

Figure 2:
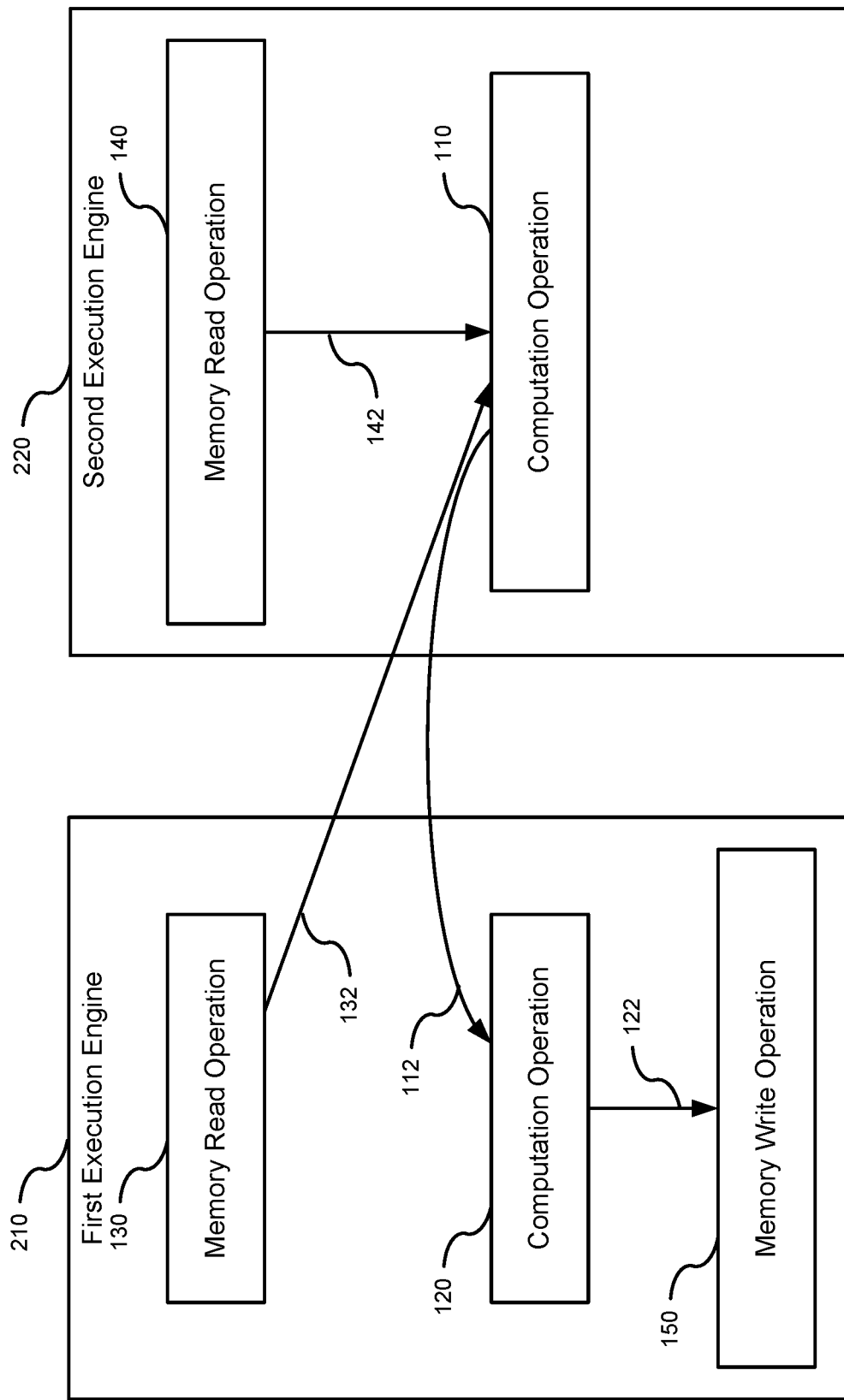
FIG. 2 is a diagram illustrating the operations in the dataflow graph of FIG. 1 as these operations may be executed by a first execution engine and a second execution engine.

FIG. 2 is a diagram illustrating the operations in the dataflow graph 100 of FIG. 1 as these operations may be executed by a first execution engine 210 and a second execution engine 220. The first execution engine 210 can be, for example, a computational array of an integrated circuit device, and the second execution engine can be a pooling engine, among other examples.

In the example of FIG. 2, the operations of node 130, which includes a memory read operation, are performed by the first execution engine 210 and the operations of node 140, which also include a memory read operation, are performed by the second execution engine 220. The second execution engine then performs the operations of node 110, which include a computation operation on the outputs of node 130 and node 140. As illustrated by this example, the computation of node 110 uses the output of the memory read operation of node 130, and thus needs for the operation of node 130 to complete before the computation can be performed. Edge 132 thus illustrates a data or resource dependency between the first execution engine 210 and the second execution engine 220. In contrast, the computation of node 110 also needs the memory read operation of node 140 to be completed, but because the operations of node 140 and node 110 are performed by the same execution engine, the edge 142 does not represent a data or resource dependency because the second execution engine 220 need not wait on another execution engine in order to proceed to the operations of node 110.

Similarly, edge 112 illustrates a dependency between the first execution engine 210 and the second execution engine 220. For example, the computation operation of node 120 may require the result of the computation operation of node 110. Edge 122 further illustrates a non-dependency, since the operations of node 150 can follow the operations of node 120 without needing to wait for the operations of another execution engine to complete.

To accommodate the dependencies such as those illustrated by the examples of FIGS. 1 and 2, in various examples, the instructions generated for the integrated circuit device can make use of event registers of the integrated circuit device. In various examples, registers are a type of memory location in the integrated circuit device that can be written to by the execution units of the integrated circuit device, and, in some cases, also be written to be devices outside of the integrated circuit device. Additionally, the execution units can implement instructions that wait on a value to be written to a particular event register. When the value is written, the event is considered to have occurred. Instructions that wait on an event can cause an execution unit to halt or stall further execution of instructions until the event occurs. When the event occurs before the execution unit executes the wait instruction, then the execution need not stop at the wait instruction.

In some examples, each bit in a physical register can represent an individual event. In some examples, each physical register represents an individual event. The integrated circuit device may have a fixed or limited number of event registers. For example, the integrated circuit device may have registers representing a maximum of 256 (or some other number) of events.

In various examples, the event registers can be used to synchronize the operations of two execution engines of the integrated circuit device. For example, the instructions for node 110 can be preceded by a "wait-for-event" instruction, or a instructions that effectively waits for an event (as discussed further below), which can identify an event register. In this example, the instructions for node 140 can be followed by a "set-event" instruction, that identifies the same event register. In this example, when the second execution engine reaches the operations described in node 110, the second execution engine can first execute the "wait-for-event" instruction, and check whether a particular value (e.g., a value of "1") has been set in the event register identified by this instruction. When the value has not been set, then the operations of node 140 have not yet completed, and the second execution engine can stall. When the value is then set (or was already set when the instruction was executed), then the second execution engine can proceed with the operations of node 110.

In various examples, a procedure for generating instructions for the integrated circuit device can include identifying each dependency in a data flow graph (or another representation of sequences of operations for the integrated circuit), and including set-event and corresponding wait-on-event instructions for each dependency. For example, the procedure can include walking the dataflow graph, and identifying each occurrence of an edge where the edge starts at a node that includes operations for one execution engine and ends at a node that includes operations for a different execution engine. As a further example, the procedure can assign an event to each such edge. Events can be assigned, for example, using a numerical identifier for each event. When generating instructions according to the data flow graph, the procedure can include, for each assigned event, adding a "set-event" instruction to the instructions for the node at the start of the edge, and a "wait-on-event" instruction for the node at the end of the edge. For example, the "set-event" instruction can be a last instruction of a set of instructions generated for the node at the start of the edge, and the "wait-on-event" instruction can be a first instruction of the instructed generated for the node at the end of the edge.

In some examples, some instructions for an execution engine can include the ability to wait on an event. For example, a "matrix multiply" instruction can include an optional parameter that enables a programmer include waiting on an event to the instruction. In this and other examples, an implicit "wait-on-event" instruction may not be needed, and instead, generation of the instructions an include setting the parameters in the "matrix multiply" instruction.

In some examples, a "wait-on-event" instruction (including instructions where waiting on an event is activated by a parameter for the instruction) can clear the event being waited on, as a step in the execution of the instruction. Clearing the event can mean writing a particular value to the event register, such as a value of "0." In some examples, an explicit "clear-event" instruction can be used to clear the event. Clearing an event register frees the register to be used another time.

As noted above, in most cases the integrated circuit device has a limited number of event registers. The procedure for generating instructions for the integrated circuit can thus include keeping track of available event registers. For example, the procedure can maintain a count of the event registers, and, when walking the dataflow graph, can increment the count for each event assigned to an edge. In this example, the count can be used to identify an event to assign to the edge. Also in this example, when the count reaches the maximum number of available event registers, the procedure can introduce a synchronization point. The synchronization point can cause one or more the execution engines in the integrated circuit device to stall until each execution engine is stalled. Stalling each of the one or more execution engines can ensure that any events being waited on by these execution engines have occurred, and the corresponding event registers have been cleared. A synchronization point can thus cause all event registers to be cleared and freed for use. Stalling of the execution engines can be accomplished, for example, by having the execution engines executing a "wait-on-event" for the one event register, where the event register is written, for example, by a host processor that is capable of checking whether the execution engines are each stalled. Alternatively or additionally, stalling may be accomplished by inserting synchronization instructions into the sets of instructions generated for each execution engine. A synchronization instruction can, for example, cause an execution engine to wait on another execution engine to execute a synchronization instruction. A synchronization instruction can take the form of, for example, a halt instruction that also notifies the host processor that the execution engine has halted. In this examples, the host processor can track whether each of the execution engines are stalled, and can cause the execution engines to continue executing instructions once each of the execution engines has stalled.

Alternatively or additionally, the procedure for generating instructions may be able to determine when event register should be clear and thus available for reuse. For example, in the example of FIG. 2, when the first execution engine 210 reaches the operations at node 120, the operations at node 110 must be complete. Thus, in this example, the procedure can assume that the event associated with edge 132 has been cleared and is available for reuse. In generating instructions according to the dataflow graph, in this example, the procedure can, when node 120 is reached, can add the event assigned to edge 132 to the list of events that are available for assigning to edges.

Figure 3:
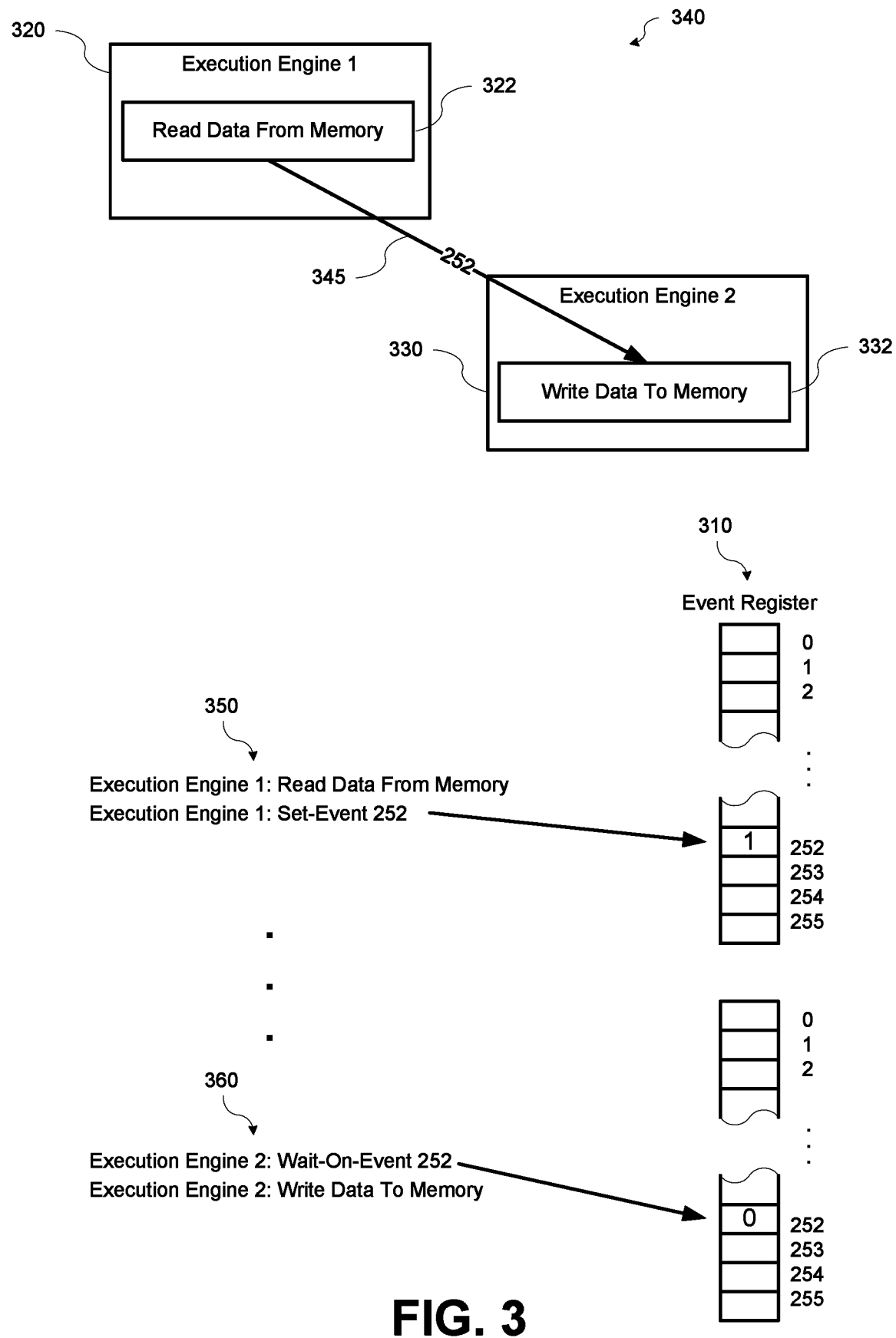
FIG. 3 is a diagram illustrating an example of setting and clearing an event in an event register.

The procedure for generating instructions may assign individual events, for example 256 events or another number of events, to dependency edges of the dataflow graph in order to implement the dependencies represented by the edges. In some examples, the events may correspond to indexed locations in an event register. The event register may be a fixed length, for example, 256 bits or another length. To assign the events, the procedure can, for example, maintain an array of 256 entries that represent the bits in the event register. FIG. 3 is a diagram that illustrates an example of setting and clearing an event in an event register 310, as may be performed by a procedure that generates instructions for an integrated circuit device.

The event register 310 may be a register containing 256 bits or another number of bits. The event register 310 may be included in the memory subsystem of the integrated circuit device as a separate register. The individual bits in the event register 310 may be set and cleared by the set-event and wait-on-event primitives. Referring to FIG. 3, a first execution engine 320 may require data stored in memory. The first execution engine 320 may execute a read operation 322 to read the data from memory. At the same time, a second execution engine 330 may need to perform a write operation 332 to write data to memory. Due to limited resources, the second execution engine 330 may need the memory space containing the data required by the first execution engine 320 in order to perform the write operation 332. Therefore, the read operation 322 for the first execution engine 320 must complete to free up the memory locations occupied by its data before the second execution engine 330 can perform the write operation 332 to the memory locations previously containing the data for first execution engine 320. The portion of the dataflow graph 340 illustrates this dependency as edge 345.

The instruction generation procedure may assign an event number (e.g., event number 252) to the edge 345 indicating the dependency between the read operation 322 for the first execution engine 320 and the write operation 332 for the second execution engine 330. When instructions are generated from the dataflow graph, the instruction generation procedure may cause the compiler to insert a set-event instruction (e.g., "set-event 252") in the code 350 generated for the first execution engine 320, after the read operation 322. The set-event instruction, when executed, may cause the bit at indexed location 252 to be set in the event register 310.

The instruction generation procedure may also cause the compiler to insert a wait-on-event instruction (e.g., "wait-on-event 252") in the code 360 generated for the second execution engine 330, before the write operation 332. The wait-on-event instruction, when executed, may cause the second execution engine 330 to wait the first execution engine 320 to reach the set-event instruction, which the first execution engine will execute after completing the read operation 322. The wait-on-event instruction, when executed by the second execution engine 330, may also cause the bit at indexed location 252 in the event register 310 to be cleared. Thus, synchronization between the first execution engine 320 and the second execution engine 330 may be achieved.

In the preceding example, use of the bit at indexed location 252 in the event register is used as an example, with the understanding that any bit in the event register may be assigned to a dependency in the dataflow graph. In addition, the use of the read/write operation is one example of a dependency that can occur, and that other types of dependencies can occur.

In various examples, a fixed size array may be used to track available events. Each index of the fixed-size array can correspond to an event register of the integrated circuit. Values stored in the fixed-sized array can indicate whether a respective event is available to be set by the set-event instruction. For example, when a particular event is set by execution of a "set-event" instruction, a corresponding value in the fixed size array may be set to a value (e.g., a value of "1") indicating that the particular event is no longer available to be set. When the particular event is cleared, for example by a "wait-for-event" instruction corresponding to the "set-event" instruction, the corresponding value in the fixed size array may be set to a different value of (e.g., a value of "0") indicating that the particular event is again available to be set.

Certain edges of a dataflow graph may not require events for synchronization. For example, referring again to FIG. 2, the edge 122 from the second computation operation (node 120 in the first execution engine 210 to the data transfer operation at node 150 in the first execution engine 210 may not have an assigned event because both operations are executed on the same engine (i.e., the first execution engine 210). Likewise, the edge 142 from the data transfer operation at node 140 in the second execution engine 220 to the first computation operation at node 110 in the second execution engine 220 may not have an assigned event because both operators are executed on the same engine (i.e., the second execution engine 220).

The instruction generation procedure may handle an arbitrary number of input or output edges. The only restriction on the dataflow graph is that it does not contain directed cycles; that is, repetitions of nodes and edges in the sequences of the graph (e.g., loops in the graph). A directed cycle can result in a deadlock condition, where, for example, a first execution engine is waiting on an event to be set by a second execution engine, which is in turn waiting for an event to be set by the first execution engine. When the number of edges requiring an event assignment in the dataflow graph is less than or equal to than the number of events available in the event register (e.g., 256 events), each edge requiring an event assignment in the dataflow graph may be assigned a different event, and such assignments would be legal.

For very large data flow graphs, the number of edges requiring an event assignment in may be much larger than the number of events available in the event register; therefore, events may be reused. Events that are cleared by wait-on-event instructions may be reused for subsequent events. Reusing events incorrectly may introduce race conditions that could cause incorrect behavior.

In one example, incurred behavior can result when there is double setting or double clearing of an event. Double setting of an event occurs when two or more set-event instructions set a particular event register without each having a corresponding wait-on-event instruction.

Double setting can result in ambiguity as to which set-event is supposed to trigger the wait-on-event, such that the instructs triggered by the wait-on-event being satisfied may not execute correctly. Double clearing of an event occurs when an event register is cleared (e.g., by a wait-on-event instruction, an explicit clear-event instruction, or another instruction) at least twice without having been set in between. Double clearing indicates that a set-event instruction may be missing, or that a wait-on-event instruction may be missing, or both, and that the operations of two or more execution units may not be properly synchronized.

In another example, incorrect behavior can occur when two or more execution engines waiting on the same event. If two execution engines wait on the same event, one execution engine may clear the event (e.g., by execution of the wait-on-event instruction) before the other execution engine starts waiting for the event. In such case, the latter execution engine may become deadlocked; that is, the event may not occur again, and the execution engine may not be able to complete execution of its instructions.

In order to reuse events correctly, in some examples, barriers may be introduced to synchronize all execution engines having events set in the event register. For example, when all bits in the event register are set by various set-event instructions, a barrier may be introduced preventing further set-event instructions from being executed until all corresponding wait-on-event instructions have been executed. After all wait-on-event instructions have been executed (e.g., after each barrier), all events may be available for reuse. In some examples, the number of barriers may be reduced, thereby improving event reuse, by propagating knowledge of event consumption to execution engines other than the execution engine where the event is consumed without synchronizing all engines via barriers.

In some examples, a synchronization instruction may be inserted in the program code prior to a last instruction in a first set of program code for a first execution engine to halt execution of instructions by the first execution engine until each other execution engine of the integrated circuit reaches a similar synchronization instruction in their program code. When the first execution engine and each other execution engine of the integrated circuit reaches the synchronization instructions in their program code, each of the event registers are clear.

In some examples, the instruction generations procedure can include an event assignment checking procedure, which can check that event assignments are correct. The event assignment checking procedure may check, for example, that execution order (e.g., instruction interleaving) obeys the dependencies expressed by the dataflow graph. Additionally, the assignment checking procedure may verify that, for any event, the sequence of operations on the event alternates between set-event and wait-on-event operations, with set-event being the first operation and wait-on-event being the second operation. A violation of this property may lead to double-set or double-clear violation. The assignment checking procedure may further verify, for any execution order that obeys the dependencies expressed by the dataflow graph, that each engine completes its program (e.g., absence of deadlock).

Figure 4:
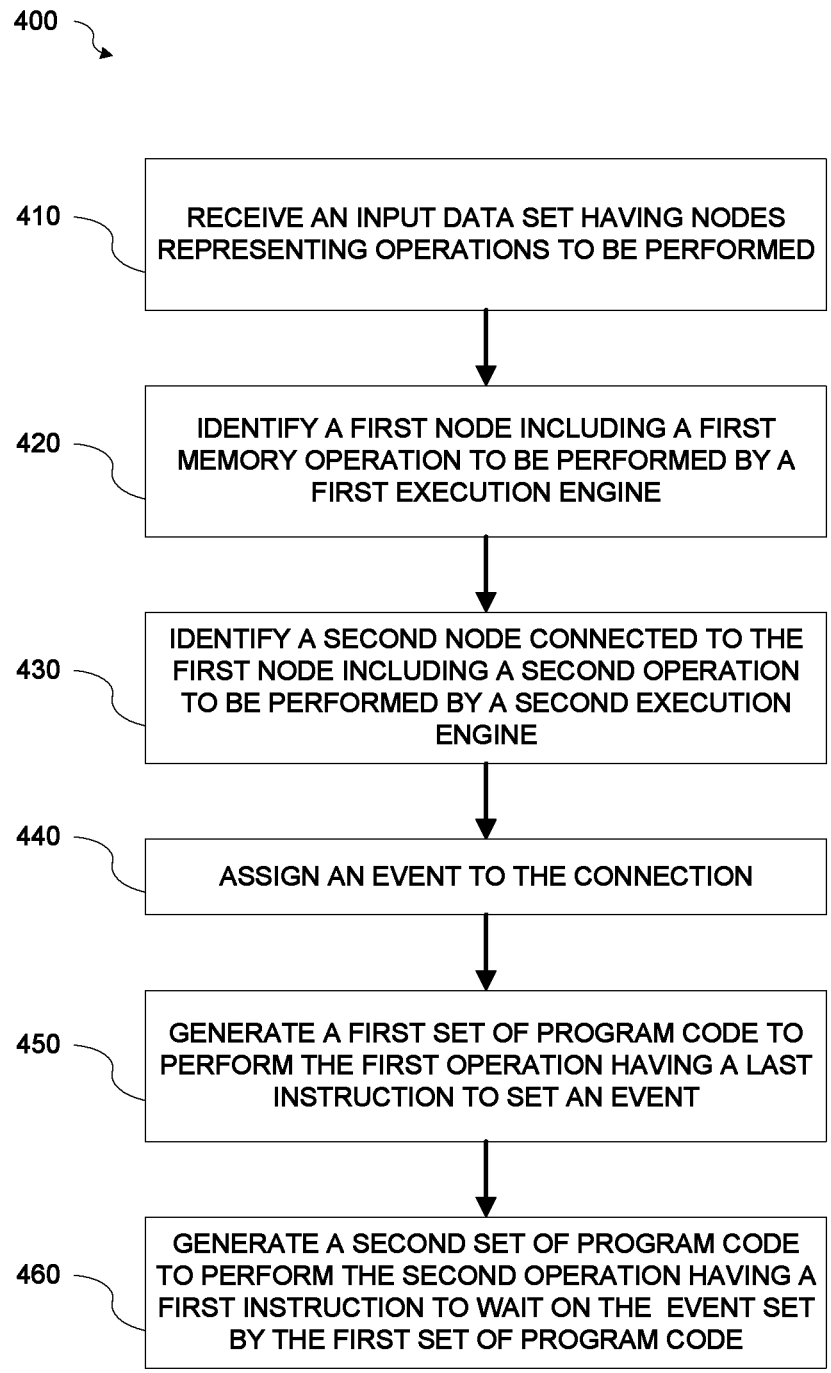
FIG. 4 is a flowchart illustrating an example computer-implemented method for generating program code.

FIG. 4 is a flowchart illustrating an example computer-implemented method 400 for generating program code for an integrated circuit device. In various examples, the method 400 can be performed by a computing device that includes a processor and a memory operable to store instructions that can be executed by the processor, the instructions including ones for performing the steps of the method 400. In various examples, the method 400 may be embodied on a non-transitory computer readable medium.

Referring to FIG. 4, a compiler may generate an input data set that describes the operations to be performed by an integrated circuit device. The integrated circuit may receive the input data set (block 410). The input data set may be organized in a graph, for example a dataflow graph, having connections between nodes. The nodes in the graph may represent operations to be performed by an execution engine, for example, a first execution engine or a second execution engine, of an integrated circuit device and the connections between the nodes may represent data and/or resource dependencies between the nodes. Because of the dependencies, operations between the execution engines may need to be synchronized.

Block 420 of the method identifies a first node in the input data set with a data or resource dependency. The first node on the graph may include a first operation to be performed by the first execution engine. The first operation may include a first memory operation involving a memory location in the integrated circuit device. The first operation may include a computation or a data transfer operation. The first node may have a graph edge indicating the dependency from another node on the graph. For example, a computation or a memory transfer operation may need to be completed by the first execution engine to enable an operation performed by the second execution engine to begin.

At block 430, a second node in the input data set that has a connection indicating a dependency from the first node may be identified. The second node may include a second operation to be performed by the second execution engine. The second operation may use the memory location used by the first memory operation. Thus, the second operation may require the first memory operation performed by the first execution engine to be completed before the second operation begins.

An event may be assigned to the connection between the first node and the second node at block 440 of the method. An instruction generation procedure may assign an event to the connection (i.e., the graph edge connecting the first and second nodes). The integrated circuit device can implement events using hardware registers. An event is set when, for example, a register contains a value of "1" and is not set when the register contains a value of "0." Hardware registers can have a small footprint on the chip die, and little circuitry is needed to write a register value or check a register value.

The instruction generation procedure may assign individual events, for example 256 events or another number of events, to dependency edges of the dataflow graph in order to implement the dependencies represented by the edges. The events may correspond to indexed locations in an event register of the integrated circuit. The event register may be a fixed length, for example, 256 bits or another length. To assign the events, the instruction generation procedure may set corresponding bits in indexed locations of the event register. At block 440, the instruction generation procedure may set a bit in the event register corresponding to the connection between the first node and the second node of the graph (i.e., the input data set).

In order to maintain the order of operations having data and/or resource dependencies, at block 450 a first set of program code including a set-event instruction may be generated for the first execution engine. The instructions in the first set of program code for performing the first operation may include the set-event instruction as a last instruction in the first set of program code. The set-event instruction may be an instruction to set a value in the event register associated with the event. The integrated circuit device can implement the event using a hardware register, e.g., an event register.

An event is set when, for example, a register contains a value of "1" and is not set when the register contains a value of "0." When the set-event instruction is executed, a bit in an indexed location of the event register corresponding to the event may be set. The instruction generation procedure may assign an event to the dependency edge of the dataflow graph indicating the dependency between the first memory operation on the first execution engine and the second memory operation on the second execution engine. The event may correspond to an indexed location in the event register of the integrated circuit. The bit corresponding to the event may be set in the event register when the first set of program code is executed and the set-event instruction is reached.

At block 460, a second set of program code including a wait-on-event instruction and instructions for performing the second operation may be generated for the second execution engine. The second set of program code may include the wait-on-event instruction as a first instruction in the second set of program code. The wait-on-event instruction may cause the second execution engine to wait for the bit corresponding to the event to be set in the event register. For example, the instruction generation procedure may assign an event to a dependency edge of the dataflow graph indicating a dependency between the first memory operation on the first execution engine and the second memory operation on the second execution engine. The event may correspond to an indexed location in the event register of the integrated circuit. The bit corresponding to the event may be set in the event register when the first set of program code is executed by the first execution engine and the set-event instruction is reached. Because the wait-on-event instruction is generated as the first instruction in the second set of program code, when the second set of program code is executed the wait-on-event instruction may cause the second execution engine to wait for the operations performed by the first execution engine to complete and cause the corresponding bit in the event register to be set before starting execution of the second operation by the second execution engine. The wait-on-event instruction may also cause the corresponding event set in the event register to be cleared.

Values stored in a fixed-sized array can indicate whether a respective event is available to be set by the set-event instruction. For example, when a particular event is set by execution of a "set-event" instruction, a corresponding value in the fixed size array may be set to a value (e.g., a value of "1") indicating that the particular event is no longer available to be set. When the particular event is cleared, for example by a "wait-for-event" instruction corresponding to the "set-event" instruction, the corresponding value in the fixed size array may be set to a different value of (e.g., a value of "0") indicating that the particular event is again available to be set.

In some cases, execution engines may execute non-blocking instructions, also referred to as asynchronous instructions. An asynchronous instruction is a non-blocking instruction that may not finish completely before a next instruction begins executing. Code execution issues may arise when a non-blocking instruction executing on one execution engine needs to inform two or more other execution engines having dependencies that the non-blocking instruction has completely finished.

Non-blocking instructions may include an embedded set-event instruction in addition to explicit set-event/wait-on-event instructions. The embedded set-event instruction executes when a non-blocking instruction completely finishes, which can be many cycles after the non-blocking instruction starts. The explicit set-event instruction, on the other hand, executes as soon as the non-blocking instruction starts.

In some embodiments, the embedded set-event instruction may be followed by an explicit wait-on-event instruction. The explicit wait-on-event instruction may cause the execution engine to wait on its own embedded set-event instruction. The explicit wait-on-event instruction for the non-blocking instruction may be followed by explicit wait-on-event instructions for other execution engines having dependencies on the non-blocking instruction.

Example pseudo-code is shown below:
1 Async op (c, a, b) [set event 3]
2 Wait event 3
3 Set event 5
4 Set event 7
5 Ops At line 1, a first execution engine may execute an example non-blocking operation on variables a and b to produce result c. A second execution engine and a third execution engine may depend on the result c. The non-blocking instruction includes the embedded set-event instruction to set event 3. At line 2 an explicit wait-on event instruction may cause the first execution engine to wait on the embedded set-event instruction that was set as part of the non-blocking instruction in line 1. After the non-blocking instruction has completed to set event 3 and the wait-on-event instruction in line 2 has executed, at line 3 the first execution engine may execute an explicit set-event instruction (i.e., set event 5) to set an event for a second execution engine and may execute another explicit set-event instruction (i.e., set event 7) to set an event for a third execution engine indicating that the non-blocking instruction has completed. At line 5, code execution may continue for the first execution engine.

In some embodiments, the non-blocking operation may include an embedded set-event instruction and the explicit wait-on-event instruction may be sent for execution to other execution engines having dependencies on the non-blocking instruction.

Example pseudo-code is shown below:
First Execution Engine
  1 Async op (c, a, b) [set event 5]
  2 Ops
Second Execution Engine
  1 Wait-on-event 5
  2 Set event 7
  3 Ops
Third Execution Engine
  1 Wait-on-event 7
  2 Ops At line 1 for the first execution engine, the first execution engine may execute an example non-blocking operation on variables a and b to produce result c. The non-blocking instruction includes the embedded set-event instruction to set event 5 to set an event for the second execution engine which depends on the result c. After starting the non-blocking instruction at line 1, at line 2 the first execution engine may continue executing code.

At line 1 for the second execution engine, the second execution engine may execute the wait-on-event instruction and wait for the non-blocking operation on the first execution engine to complete and set event 5. When event 5 is set by completion of the non-blocking instruction on the first execution engine, at line 2 the second execution engine may execute an explicit set-event instruction (i.e., set event 7) to set an event for a third execution engine indicating that the non-blocking instruction on the first execution engine has completed. At line 3, code execution may continue for the second execution engine.

Finally, at line 1 for the third execution engine, the third execution engine may execute the wait-on-event instruction and wait for the second execution engine to set event 7. The second execution engine may set event 7 after the non-blocking operation on the first execution engine has completed and set event 5. At line 2, code execution may continue for the third execution engine.

Thus, the set-event instruction is sent to the second execution engine, and the second execution engine than broadcasts it to all other engines that wait on the non-blocking instruction on the first engine. Accordingly, additional non-blocking instructions may be executed before the first non-blocking instruction has completed.

In some cases, the same execution engine that executes a non-blocking instruction may need to wait for the non-blocking instruction to complete before continuing to execute code. In such cases, the non-blocking instruction including the embedded set-event instruction may be followed by explicit wait-on-event instruction to cause the execution engine to wait for the non-blocking instruction to completely finish.

Example pseudo-code is shown below:
1 Async op (c, a, b) [set event 9]
2 Wait event 9
3 Ops At line 1, an execution engine may execute an example non-blocking operation on variables a and b to produce result c. The non-blocking instruction includes the embedded set-event instruction to set event 9. At line 2 an explicit wait-on event instruction may cause the execution engine to wait on the embedded set-event instruction that was set as part of the non-blocking instruction in line 1. After the non-blocking instruction has completed to set event 9 and the wait-on-event instruction in line 2 has executed, at line 3 code execution may continue for the execution engine.

Figure 5:
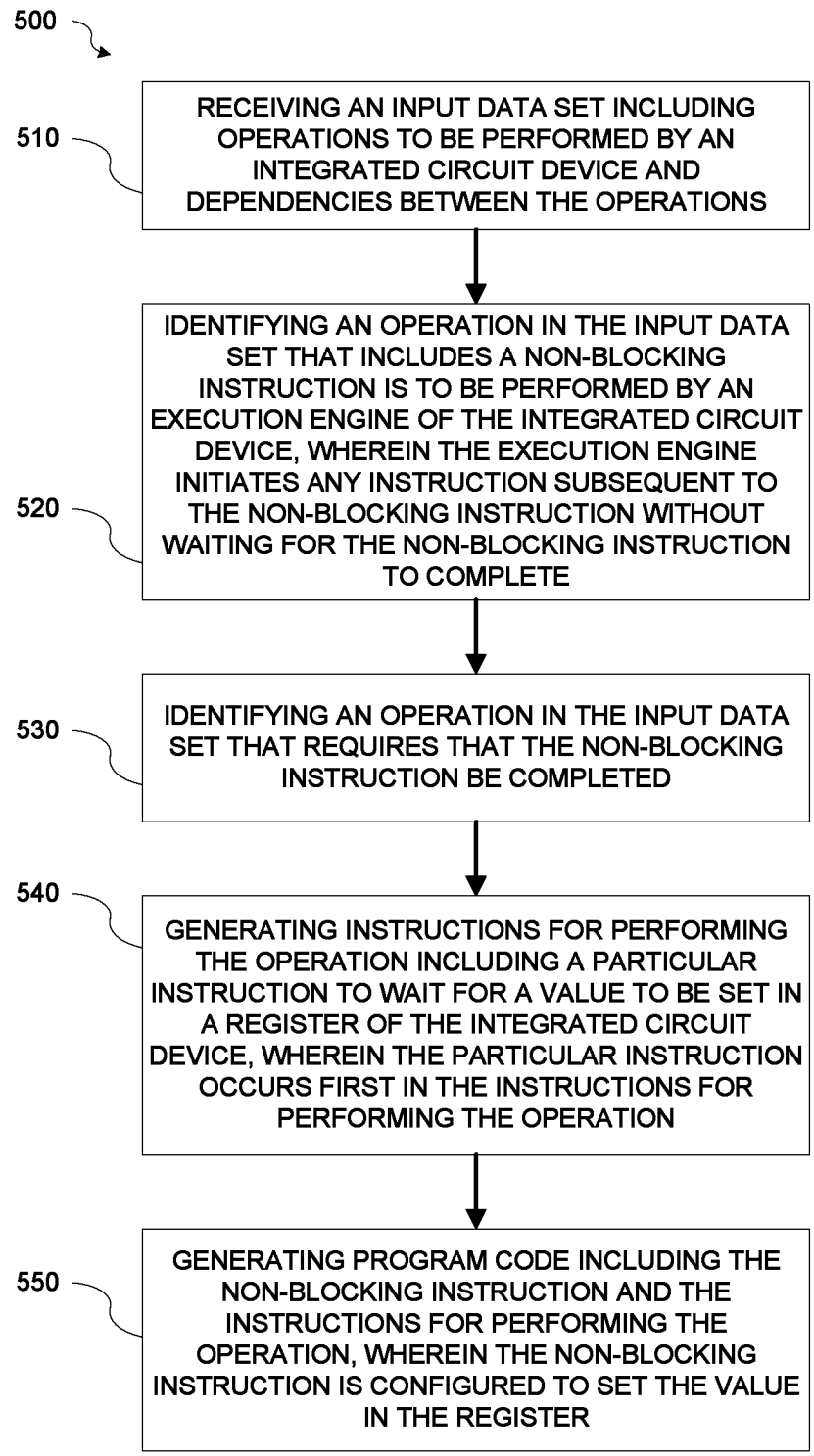
FIG. 5 is a flowchart illustrating an example of a process for generating program code for an integrated circuit device.

FIG. 5 is a flowchart illustrating an example of a process 500 for generating program code for an integrated circuit device. In various examples, the process 500 can be performed by a computing device that includes a processor and a non-transitory computer-readable medium, such as a memory or storage disk. The computer-readable medium can include instructions that, when executed by the processor, cause the processor to perform the steps of the process 500.

At block 510, the process 500 includes receiving an input data set including operations to be performed by an integrated circuit device and dependencies between the operations. In some examples, the input data set is organized in a graph. In these examples, nodes in the graph represent operations to be performed by the integrated circuit device, and connections between the nodes represent data or resource dependencies between the nodes. A data dependency can occur when an input for an operation described by one node is data that is output by another node. A resource dependency can occur when an operation described by one need uses a hardware resource that is also used by an operation described by another node. The hardware resource can be, for example, a location in a memory of the integrated circuit device.

At block 520, the process 500 includes identifying an operation in the input data set that includes a non-blocking instruction is to be performed by an execution engine of the integrated circuit device. By being non-blocking, the execution engine can initiate any instruction subsequent to the non-blocking instruction without waiting for the non-blocking instruction to complete. Non-blocking instructions can improve the efficiency of the integrated circuit device because the execution engine can work on other instructions while the non-blocking instruction completes in the background.

At block 530, the process 500 includes identifying an operation in the input data set that requires the non-blocking instruction be completed. For example, the operation may use the output of the non-blocking instruction as an input. As another example, the operation may use a memory location from which the non-blocking instruction reads a value, or to which the non-blocking instruction will write a value. In the input data set, the operation may be identified as having a connection to the operation that includes the non-blocking instruction.

At block 540, the process 500 includes generating instructions for performing the operation. The instructions can include a particular instruction for wait for a value to be set in a register of the integrated circuit device. The particular instruction occurs first in the instructions for performing the operation, so that subsequent instructions are made to wait until the particular instruction completes.

At block 550, the process 500 includes generating program code including the non-blocking instruction and the instructions for performing the operation, wherein the non-blocking instruction is configured to set the value in the register. The non-blocking instruction can, for example, include a parameter that can be used to identify the register. The register can be identified using a number, for example. In various examples, the parameter may be optional. In some examples, the register is referred to as an event register, and writing of a value to the register indicates the occurrence of an event. In these examples, the non-blocking instruction can write the value to register when the instruction completes, and the particular instruction, generated at block 540, waits on the value to be written. The particular instruction thus enforces the dependency by making the instructions for the operation wait for the non-blocking instruction to complete.

In some examples, the operation noted at block 530 is performed by the execution engine. In these examples, the program code generated at block 550 results in the execution engine executing the non-blocking instruction and waiting for the non-blocking instruction to complete before performing the operation.

In some examples, the operation is performed by a second execution engine of the integrated circuit device. In these examples, the program code can include a first set of instructions for the execution engine and a second set of instructions for the second execution engine. In some examples, the first set of instructions includes the particular instruction (e.g., the instruction that waits on the value to be written to the register). In these examples, the first set of instructions can further include a first instruction that sets a first value in a first register of the integrated circuit device (e.g., to indicate the occurrence of an event), and the second set of instructions can include a second instruction that waits for the first value to be set in the first register. In this example, the second execution engine is made to wait until the non-blocking instruction is executed, and will execute the second set of instructions when the first execution engine sets the event using the first register.

In some examples, the first set of instructions discussed above can further include a third instruction that sets a second value in a second register of the integrated circuit device (e.g., to indicate the occurrence of another event). In these examples, the program code can further includes a third set of instructions for a third execution engine of the integrated circuit device. The third set of instructions can include a fourth instruction that waits for the second value to be set in the second register. In this example, the third execution engine waits for the non-blocking instruction to complete, and will execute the third set of instructions when the first execution engine sets the event using the second register.

In some examples, the second set of instructions includes the particular instruction. In these examples, the second set of instructions can include a first instruction that sets a first value in a first register of the integrated circuit device (e.g., to indicate the occurrence of an event). The program code can further include a third set of instructions for a third execution engine of the integrated circuit device. The third set of instructions include a second instruction that waits for the first value to be set in the first register. In this example, the third execution engine begins executing the third set of instructions when the second execution engine sets an event using the first register.

In various examples, the register noted in block 540 and block 550 is one of a fixed number of registers of the integrated circuit device. For example, the integrated circuit device can have 250 registers that can be used to indicate events. In some examples, the process 500 can further include selecting the register from the fixed number of registers. In these examples, the register can be selected based on the register not being associated with a previously generated instruction for writing a previous value to the register. In some examples, a previously generated instruction is associated with the register, in which case the register is selected based on the previously generated instruction causing a value in the register to be cleared. In some examples, the process 500 can further include determining that each of the fixed number of registers is associated with respective previously generated instructions for writing values to the fixed number of registers. In these examples, the process 500 can further include inserting a synchronization instruction into the program code, where the synchronization instruction causes the execution engine to stop further execution of instructions until another execution engine of the integrated circuit device reaches a similar synchronization instruction.

In various examples, the process 500 includes inserting, after the particular instruction, an instruction to clear the value in the register. Clearing the register frees the register to be used again for another dependency in the input data set. In some examples, the particular instruction that waits on a value to be written to the register also clears the value in the register when the particular instruction is executed.

Figure 6:
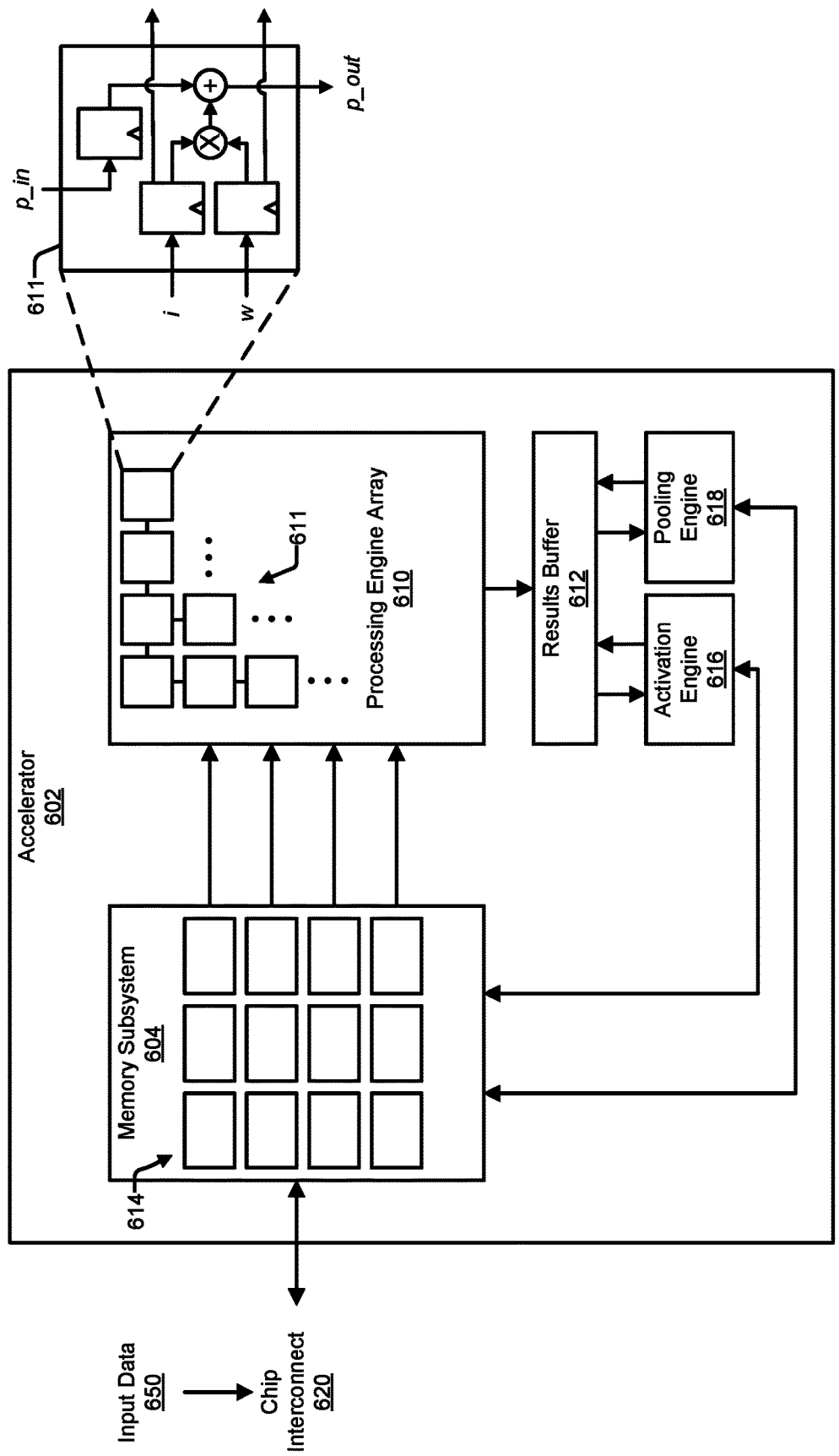
FIG. 6 is a block diagram illustrating an example of an integrated circuit device that includes multiple execution engines that can have data inter-dependencies.

FIG. 6 is a block diagram illustrating an example of an integrated circuit device that includes multiple execution engines that can have data inter-dependencies. The example of FIG. 6 illustrates an accelerator engine 602. In various examples, the accelerator engine 602, for a set of input data (e.g., input data 650), can execute computations using a processing engine array 610, an activation engine 616, and/or a pooling engine 618. In some examples, the example accelerator engine 602 may be an integrated circuit component of a processor, such as a neural network processor. The processor may have other integrated circuit components, including additional accelerator engines.

In various implementations, the memory subsystem 604 can include multiple memory banks 614. In these implementations, each memory bank 614 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 614. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 604 can permit simultaneous access to the read or write channels of multiple memory banks. As another example, the memory subsystem 604 can include arbitration logic such that arbitration between, for example, the outputs of multiple memory banks 614 can result in more than one memory bank's output being used. In these and other examples, though globally managed by the memory subsystem 604, each memory bank can be operated independently of any other.

Having the memory banks 614 be independently accessible can increase the efficiency of the accelerator 602. For example, values can be simultaneously read and provided to each row of the processing engine array 610, so that the entire processing engine array 610 can be in use in one clock cycle. As another example, the memory banks 614 can be read at the same time that results computed by the processing engine array 610 are written to the memory subsystem 604. In contrast, a single memory may be able to service only one read or write at a time. With a single memory, multiple clock cycles can be required, for example, to read input data for each row of the processing engine array 610 before the processing engine array 610 can be started.

In various implementations, the memory subsystem 604 can be configured to simultaneously service multiple clients, including the processing engine array 610, the activation engine 616, the pooling engine 618, and any external clients that access the memory subsystem 604 over a communication fabric 620. In some implementations, being able to service multiple clients can mean that the memory subsystem 604 has at least as many memory banks as there are clients. In some cases, each row of the processing engine array 610 can count as a separate client. In some cases, each column of the processing engine array 610 can output a result, such that each column can count as a separate write client. In some cases, output from the processing engine array 610 can be written into the memory banks 614 that can then subsequently provide input data for the processing engine array 610. As another example, the activation engine 616 and the pooling engine 618 can include multiple execution channels, each of which can be separate memory clients. The memory banks 614 can be implemented, for example, using static random access memory (SRAM).

In various implementations, the memory subsystem 604 can include control logic. The control logic can, for example, keep track of the address spaces of each of the memory banks 614, identify memory banks 614 to read from or write to, and/or move data between the memory banks 614. In some implementations, memory banks 614 can be hardwired to particular clients. For example, a set of memory banks 614 can be hardwired to provide values to the rows of the processing engine array 610, with one memory bank servicing each row. As another example, a set of memory banks can be hired wired to receive values from columns of the processing engine array 610, with one memory bank receiving data for each column.

The processing engine array 610 is the computation matrix of the example accelerator 602. The processing engine array 610 can, for example, execute parallel integration, convolution, correlation, and/or matrix multiplication, among other things. The processing engine array 610 includes multiple processing engines 611, arranged in rows and columns, such that results output by one processing engine 611 can be input directly into another processing engine 611. Processing engines 611 that are not on the outside edges of the processing engine array 610 thus can receive data to operate on from other processing engines 611, rather than from the memory subsystem 604.

In various examples, the processing engine array 610 uses systolic execution, in which data arrives at each processing engine 611 from different directions at regular intervals. In some examples, input data can flow into the processing engine array 610 from the left and weight values can be loaded at the top. In some examples weights and input data can flow from the left and partial sums can flow from top to bottom. In these and other examples, a multiply-and-accumulate operation moves through the processing engine array 610 as a diagonal wave front, with data moving to the right and down across the array. Control signals can be input at the left at the same time as weights, and can flow across and down along with the computation.

In various implementations, the number of columns in the processing engine array 610 determines the computational capacity of the processing engine array 610, and the number of rows determines the required memory bandwidth for achieving maximum utilization of the processing engine array 610. The processing engine array 610 can have, for example, 64 columns and 428 rows, or some other number of columns and rows.

An example of a processing engine 611 is illustrated in FIG. 6 in an inset diagram. As illustrated by this example, a processing engine 611 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 611.

In the illustrated example, an input from above can include a partial sum, p_in, provided either from another processing engine 611 or from a previous round of computation by the processing engine array 610. When starting a computation for a new set of input data, the top row of the processing engine array 610 can receive a fixed value for p_in, such as zero. As illustrated by this example, i and w are multiplied together and the result is summed with p_in to produce a new partial sum, p_out, which can be input into another processing engine 611. Various other implementations of the processing engine 611 are possible.

Outputs from the last row in the processing engine array 610 can be temporarily stored in the results buffer 612. The results can be intermediate results, which can be written to the memory banks 614 to be provided to the processing engine array 610 for additional computation. Alternatively, the results can be final results, which, once written to the memory banks 614 can be read from the memory subsystem 604 over the communication fabric 620, to be output by the system.

In some implementations, the accelerator 602 includes an activation engine 616. In these implementations, the activation engine 616 can combine the results from the processing engine array 610 into one or more output activations. For example, for a convolutional neural network, convolutions from multiple channels can be summed to produce an output activation for a single channel. In other examples, accumulating results from one or more columns in the processing engine array 610 may be needed to produce an output activation for a single node in the neural network. In some examples, activation engine 616 can be bypassed.

In various examples, the activation engine 616 can include multiple separate execution channels. In these examples, the execution channels can correspond to the columns of the processing engine array 610, and can perform an operation on the outputs of a column, the result of which can be stored in the memory subsystem 604. In these examples, the activation engine 616 may be able to perform between 1 and n parallel computations, where n is equal to the number of columns in the processing engine array 610. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 602 can include a pooling engine 618. Pooling is the combining of outputs of the columns of the processing engine array 610. Combining can include for example, computing a maximum value, a minimum value, an average value, a median value, a summation, a multiplication, or another logical or mathematical combination. In various examples, the pooling engine 618 can include multiple execution channels that can operating on values from corresponding columns of the processing engine array 610. In these examples, the pooling engine 618 may be able to perform between 1 and n parallel computations, where n is equal to the number of columns in the processing engine array 610. In various examples, execution channels of the pooling engine 618 can operate in parallel and/or simultaneously. In some examples, the pooling engine 618 can be bypassed.

Herein, the activation engine 616 and the pooling engine 618 may be referred to collectively as execution engines. The processing engine array 610 is another example of an execution engine. Another example of an execution engine is a Direct Memory Access (DMA) engine, which may be located outside the accelerator 602.

Input data 650 can arrive over the communication fabric 620. The communication fabric 620 can connect the accelerator 602 to other components of a processor, such as a DMA engine that can obtain input data 650 from an Input/Output (I/O) device, a storage drive, or a network interface. The input data 650 can be, for example one-dimensional data, such as a character string or numerical sequence, or two-dimensional data, such as an array of pixel values for an image or frequency and amplitude values over time for an audio signal. In some examples, the input data 650 can be three-dimensional, as may be the case with, for example, the situational information used by a self-driving car or virtual reality data. In some implementations, the memory subsystem 604 can include a separate buffer for the input data 650. In some implementations, the input data 650 can be stored in the memory banks 614 when the accelerator 602 receives the input data 650.

In some examples, the accelerator 602 can implement a neural network processing engine. In these examples, the accelerator 602, for a set of input data 650, can execute a neural network to perform a task for which the neural network was trained. Executing a neural network on a set of input data can be referred to as inference or performing inference.

The weights for the neural network can be stored in the memory subsystem 604, along with input data 650 on which the neural network will operate. The neural network can also include instructions, which can program the processing engine array 610 to perform various computations on the weights and the input data. The instructions can also be stored in the memory subsystem 604, in the memory banks 614 or in a separate instruction buffer. The processing engine array 610 can output intermediate results, which represent the outputs of individual layers of the neural network. In some cases, the activation engine 616 and/or pooling engine 618 may be enabled for computations called for by certain layers of the neural network. The accelerator 602 can store the intermediate results in the memory subsystem 604 for inputting into the processing engine array 610 to compute results for the next layer of the neural network. The processing engine array 610 can further output final results from a last layer of the neural network. The final results can be stored in the memory subsystem 604 and then be copied out to host processor memory or to another location.

Figure 7:
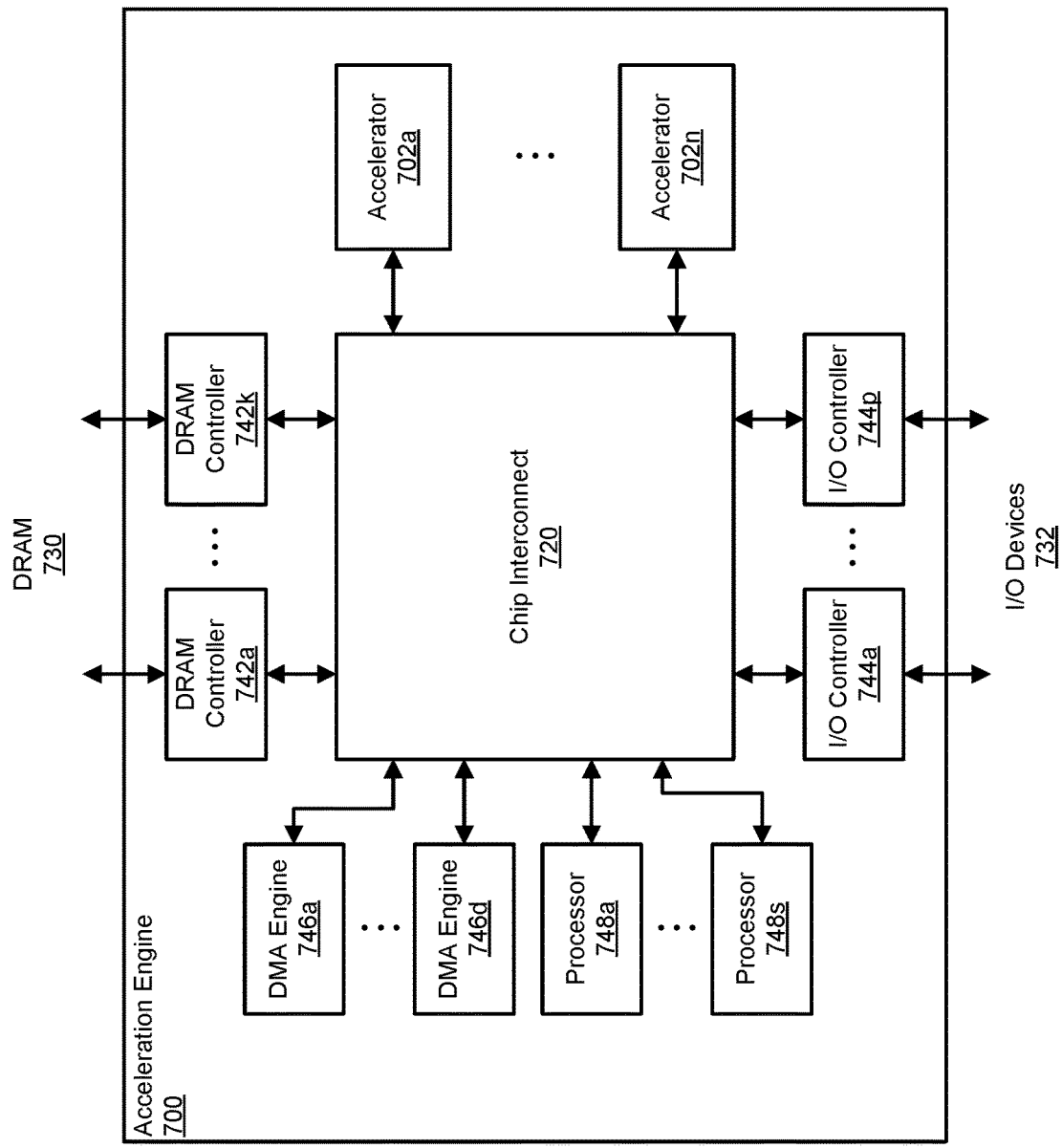
FIG. 7 includes a block diagram that illustrates an example of an acceleration engine.

FIG. 7 includes a block diagram that illustrates an example of an acceleration engine 700. The acceleration engine 700 is an example of an integrated circuit that can include one or more accelerators 702a-702n that may be similar to the accelerator illustrated in FIG. 6.

In the example of FIG. 7, the acceleration engine 700 includes multiple accelerators 702a-702n, each of which can perform a set of operations. In various examples, the accelerators 702a-702n for particular types of operations, so that the accelerators 702a-702n can perform the operations much faster than when similar operations are performed by a general purpose processor. In various examples, to perform a set of operations, input data on which the operations are to be performed must first be moved into the accelerators 702a-702n. Additionally, in some cases, program code is also moved into the accelerators 702a-702n, which programs the operations that the accelerators 702a-702n will perform on the data. In the illustrated example, the acceleration engine 700 includes n accelerators 702a-702n. Examples of accelerators that can be included in the acceleration engine 700 include graphics accelerators, floating point accelerators, neural network accelerators, and others. In various examples, the accelerators 702a-702n can each be the same (e.g., each of the is a graphics accelerator) or can be different (e.g., the accelerators 702a-702n include a graphics accelerator, a floating point accelerator, and neural network accelerator).

The example acceleration engine 700 further includes DRAM controllers 742a-742k for communicating with an external memory. The external memory is implemented, in this example, using DRAM 730. In the illustrated example, the acceleration engine 700 includes k DRAM controllers 742a-742k, each of which may be able to communicate with an independent set of banks of DRAM. In other examples, other types of RAM technology can be used for the external memory. The DRAM controllers 742a-742k can also be referred to as memory controllers.

In various examples, input data and/or program code for the accelerators 702a-702n can be stored in the DRAM 730. Different programs can cause the accelerators 702a-702n to perform different operations. For example, when one of the accelerators is a neural network accelerator, one program can configure the neural network accelerator to perform speech recognition while another program can configure the neural network accelerator to perform image recognition. In various examples, different accelerators 702a-702n can be programmed with different programs, so that each performs a different set of operations. In various examples, the processors 748a-748s can manage moving of program code from the DRAM 730 to the accelerators 702a-702n.

The example acceleration engine 700 further includes I/O controllers 744a-744p for communicating with I/O devices 732 in the system. The acceleration engine 700 can communicate with I/O devices over, for example, a processor bus. In some examples, the processor bus can be implemented using Peripheral Component Interconnect (PCI) and/or a variation of the PCI bus protocol. The processor bus can connect the acceleration engine 700 to I/O devices such as, for example, input and output devices, memory controllers, storage devices, and/or network interface cards, among other things. In some examples, the I/O controllers 744-744p can enable the acceleration engine 700 to act as an I/O device for a host processor. For example, the acceleration engine 700 can be the recipient of input data from the host processor, and a command indicating an operation to be performed on the input data (e.g., a particular computation or analysis). In the illustrated example, the acceleration engine 700 includes p I/O controllers 744a-744p, each of which may include a separate root complex and may communicate with a separate set of I/O devices 732. In other examples, other standardized bus protocols, such as Ultra Path Interconnect (UPI) can be used for the host bus. In other examples, a proprietary bus protocol can be used.

Movement of data in the acceleration engine 700 can be managed by one or more processors 748a-748s, which can also be referred to as data management processors. In the example of FIG. 7, the acceleration engine 700 includes s processors 748a-748s incorporated into (e.g., on the same silicon die) the device. In other examples, the processors 748a-748s can be external to the acceleration engine 700 (e.g., on a different die and/or in a different package). In some examples, the processors 748a-748s can manage the movement of data from I/O devices 732 to the accelerators 702a-702n or the DRAM 730. For example, input data may be located at an I/O device 732 or in processor memory, and the processors 748a-748s can move the input from the I/O device 732 or processor memory into an accelerator or into DRAM 730. As another example, program code for the accelerators 702a-702n may be located on an I/O device 732 or in processor memory.

The example acceleration engine 700 further includes DMA engines 746a-746d that can move data between the accelerators 702a-702n, DRAM controllers 742a-742k, and I/O controllers 744a-744p. In the illustrated example, the acceleration engine 700 includes d DMA engines 746a-746d. In some implementations, the DMA engines 746a-746d can be assigned to specific tasks, such as moving data from the DRAM controllers 742a-742d to the accelerators 702a-702n, or moving data between the I/O controllers 744a-744p and the accelerators 702a-702n. These tasks can be assigned, for example, by enqueueing descriptors with the DMA engines 746a-746d, where a descriptor identifies an address for a block of data and an operation (e.g., a read or a write) to perform. A descriptor, for example, can direct a DMA engine to instruct a DMA controller to read a block of data from DRAM 730. A descriptor can, as a further example, instruct the DMA engine to write data, read by the DMA controller, to an accelerator. Further descriptors can be used to move data from an accelerator to DRAM 730.

In various examples, each of the processors 748a-748s can be responsible for managing the data movement for a different accelerator. In some examples, a processor may manage the data movement for more than one accelerator. Similarly, in various examples, each of the processors 748a-748s can be assigned to one or more DMA engines 746a-746d. In these and other examples, associations between processors 748a-748s, accelerators 702a-702n, and DMA engines 746a-746d is determined by program code being executed by each respective processor.

In the example acceleration engine 700, the various components can communicate over a chip interconnect 720. The chip interconnect 720 primarily includes wiring for routing data between the components of the acceleration engine 700. In some cases, the chip interconnect 720 can include a minimal amount of logic, such as multiplexors to control the direction of data, flip-flops for handling clock domain crossings, and timing logic.

Figure 8:
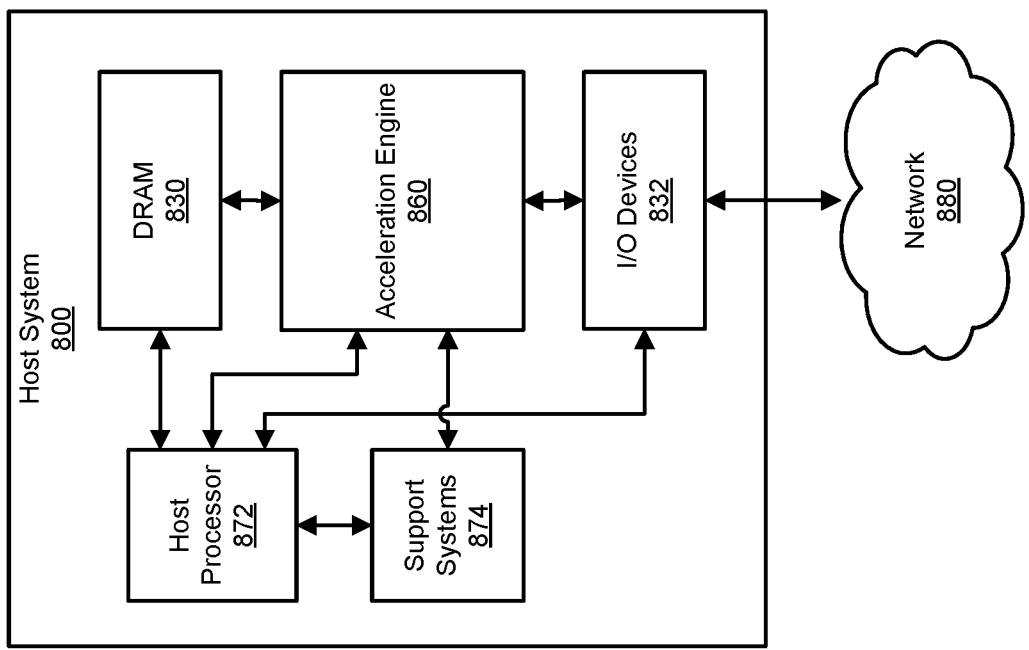
FIG. 8 includes a block diagram that illustrates an example of a host system.

FIG. 8 includes a block diagram that illustrates an example of a host system 800 in which an acceleration engine 860 can be used. The acceleration engine 860 of FIG. 8 is an example of a device that can include one or more accelerator engines such as is illustrated in FIG. 7. The example host system 800 of FIG. 8 includes the acceleration engine 860, a host processor 872, DRAM 830 or processor memory, I/O devices 832, and support systems 874. In various implementations, the host system 800 can include other hardware that is not illustrated here.

The host processor 872 is a general purpose integrated circuit that is capable of executing program instructions. In some examples, the host processor 872 can include multiple processing cores. A multi-core processor may include multiple processing units within the same processor In some examples, the host system 800 can include more than one host processor 872. In some examples, the host processor

872 and the acceleration engine 860 can be one chip, such as, one or more integrated circuits within the same package.

In various examples, the host processor 872 can communicate with other components in the host system 800 over one or more communication channels. For the example, the host system 800 can include a host processor bus, which the host processor 872 can use to communicate with the DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, storage device busses, and so on.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct inference can read the result from a conditional layer from the acceleration engine 860 and/or from a storage location, such as in DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinate by software.

The DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the DRAM 830. DRAM is a common term for processor memory, and though DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the DRAM 830 can store instructions for various programs, which can be loaded into and be executed by the host processor 872. For example, the DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage device include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the DRAM 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. as used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 832 can be PCI-based devices. In these examples, a PCI-based I/O device includes a PCI interface for communicating with the host system 800. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 874 can include hardware for coordinating the operations of the acceleration engine 860. For example, the support systems 874 can include a microprocessor that coordinates the activities of the acceleration engine 860, including moving data around on the acceleration engine 860. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have much more limited capabilities than the host processor 872. In some examples, the program executed by the microprocessor is stored on the hardware of microprocessor, or on a non-volatile memory chip in the host system 800. In some examples, the microprocessor and the acceleration engine 860 can be on chip, such as one integrated circuit on the same die and in the same package.

In some examples, the support systems 874 can be responsible for taking instructions from the host processor 872 when programs executing on the host processor 872 request the execution of a neural network. For example, the host processor 872 can provide the support systems 874 with a set of input data and a task that is to be performed on the set of input data. In this example, the support systems 874 can identify a neural network that can perform the task, and can program the acceleration engine 860 to execute the neural network on the set of input data. In some examples, the support systems 874 only needs to select an appropriate neural network processing engine of the neural network processor. In some examples, the support systems 874 may need to load the data for the neural network onto the acceleration engine 860 before the acceleration engine 860 can start executing the neural network. In these and other examples, the support systems 874 can further receive the output of executing the neural network, and provide the output back to the host processor 872.

In some examples, the operations of the support systems 874 can be handled by the host processor 872. In these examples, the support systems 874 may not be needed and can be omitted from the host system 800.

In various examples, the host system 800 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 800 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for generating program code for an integrated circuit device, comprising:

receiving, at a computing device, an input data set organized in a graph, wherein nodes in the graph represent operations to be performed by a first execution engine or a second execution engine of the integrated circuit device, and wherein connections between the nodes represent data dependencies or resource dependencies between the nodes;

identifying a first node in the input data set that includes a first operation to be performed by the first execution engine, wherein the first operation includes a first memory operation using a memory location in the integrated circuit device;

identifying a second node in the input data set that has a connection from the first node, wherein the second node includes a second operation to be performed by the second execution engine, the second operation including a second memory operation, wherein the second memory operation uses the memory location used by the first memory operation, and wherein the second memory operation requires the first memory operation to be completed;

assigning an event to the connection, wherein the event is associated with a register of the integrated circuit device;

generating a first set of program code including instructions for performing the first operation, wherein a last instruction in the first set of program code is a set-event instruction, wherein the set-event instruction causes the first execution engine to set a value in the register associated with the event;

generating a second set of program code including instructions for performing the second operation, wherein a first instruction in the second set of program code is a wait-on-event instruction, wherein the wait-on-event instruction causes the second execution engine to wait for the value to be set in the register associated with the event, wherein the second execution engine reads the value in the register associated with the event set by the first execution engine;

determining that a counter is equal to a maximum count, wherein the counter increments for each instance of a set-event instruction, and wherein the maximum count is equal to a number of event registers of the integrated circuit; and inserting a synchronization instruction prior to the last instruction in the first set of program code, wherein the synchronization instruction causes the first execution engine to stop further execution of instructions until each other execution engine of the integrated circuit device reaches a similar synchronization instruction.

2. The computer-implemented method of claim 1, wherein, when the first execution engine and each other execution engine of the integrated circuit device reaches the synchronization instruction, each of the number of event registers are cleared.

3. The computer-implemented method of claim 1, wherein the first execution engine or the second execution engine includes an array of processing engines, a computation engine executing a pooling operation, a computation engine executing an activation function, or a Direct Memory Access (DMA) engine.

4. The computer-implemented method of claim 1, wherein the integrated circuit device is a neural network processor.

5. The computer-implemented method of claim 1, wherein the register is one of a fixed number of registers of the integrated circuit device.

6. The computer-implemented method of claim 5, further comprising:

selecting the register from the fixed number of registers, wherein the register is selected based on the register not being associated with a previously generated instruction for writing a previous value to the register.

7. A computer-implemented method, comprising:

receiving, at a computing device, an input data set including operations to be performed by an integrated circuit device and data dependencies or resource dependencies between the operations, wherein events are assigned to the dependencies, and the events are associated with registers of the integrated circuit device;

identifying a first memory operation in the input data set, wherein the first memory operation is to be performed by a first execution engine of the integrated circuit device;

identifying a second operation in the input data set, wherein the second operation is to be performed by a second execution engine of the integrated circuit device, wherein the second operation requires that the first memory operation be completed;

generating a first set of program code including an instruction for performing the first memory operation, wherein a last instruction in the first set of program code is an instruction to set a value in a register of the integrated circuit device, wherein the last instruction causes a value to be set in a register associated with a first event;

generating a second set of program code including instructions for performing the second operation, wherein a first instruction in the second set of program code is an instruction to wait for the value to be set in the register, wherein the first instruction causes the second execution engine to wait for the value to be set in the register associated with the first event, wherein the second execution engine reads the value in the register associated with the first event set by the first execution engine;

determining that a counter is equal to a maximum count, wherein the counter increments for each instance of a set-event instruction, and wherein the maximum count is equal to a number of event registers of the integrated circuit; and inserting a synchronization instruction prior to the last instruction in the first set of program code, wherein the synchronization instruction causes the first execution engine to stop further execution of instructions until each other execution engine of the integrated circuit device reaches a similar synchronization instruction.

8. The computer-implemented method of claim 7, wherein the first memory operation is writing a result to a memory of the integrated circuit device, and wherein the second operation uses the result.

9. The computer-implemented method of claim 7, wherein the first memory operation is reading a first value from a location in a memory of the integrated circuit device, and wherein the second operation includes writing a second value to the location in memory.

10. The computer-implemented method of claim 7, wherein the register is one of a fixed number of registers of the integrated circuit device.

11. The computer-implemented method of claim 10, further comprising:

selecting the register from the fixed number of registers, wherein the register is selected based on the register not being associated with a previously generated instruction for writing a previous value to the register.

12. The computer-implemented method of claim 10, further comprising:

selecting the register from the fixed number of registers, wherein a previously generated instruction is associated with the register, and wherein the register is selected based on the previously generated instruction causing a previous value in the register to be cleared.

13. The computer-implemented method of claim 7, further comprising:

inserting, after the first instruction in the second set of program code, an instruction to clear the value in the register.

14. The computer-implemented method of claim 7, wherein the first instruction in the second set of program code clears the value in the register.

15. The computer-implemented method of claim 7, wherein the first execution engine and the second execution engine are operable to perform computations on data or move data into or out of the integrated circuit device.

16. The computer-implemented method of claim 7, wherein the first set of program code to be performed by the first execution engine comprises a non-blocking instruction that includes an embedded set-event instruction, and
wherein the second set of program code to be performed by the second execution engine includes an explicit wait-on-event instruction, wherein the explicit wait-on-event instruction causes the second execution engine to wait on an event set by the embedded set-event instruction.

17. A computing system, comprising:
one or more processors; and
a non-transitory computer-readable medium including instructions that, when executed by the processor, cause the one or more processors to perform operations including:
receiving an input data set including operations to be performed by an integrated circuit device and data dependencies or resource dependencies between the operations;
identifying a first memory operation in the input data set, wherein the first memory operation is to be performed by a first execution engine of the integrated circuit device;
identifying a second operation in the input data set, wherein the second operation is to be performed by a second execution engine of the integrated circuit device, wherein the second operation requires that the first memory operation be completed;
generating a first set of program code including an instruction for performing the first memory operation, wherein a last instruction in the first set of program code is a set-event instruction, wherein the set-event instruction causes the first execution engine to set a value in a register associated with an event;
generating a second set of program code including instructions for performing the second operation, wherein a first instruction in the second set of program code is wait-on-event instruction corresponding to the set-event instruction, wherein the wait-on-event instruction causes the second execution engine to wait for the value to be set in the register associated with the event, wherein the second execution engine reads the value in the register associated with the first event set by the first execution engine;
determining that a counter is equal to a maximum count, wherein the counter increments for each instance of a set-event instruction, and wherein the maximum count is equal to a number of event registers of the integrated circuit; and
inserting a synchronization instruction prior to the last instruction in the first set of program code, wherein the synchronization instruction causes the first execution engine to stop further execution of instructions until each other execution engine of the integrated circuit device reaches a similar synchronization instruction.

18. The computing system of claim 17, wherein the non-transitory computer-readable medium further includes instructions that, when executed by the one or more processors, cause the one or more processors to perform operations including:
identifying a second memory operation in the input data set, wherein the second memory operation is to be performed by a third execution engine of the integrated circuit device;
identifying a third operation in the input data set, wherein the third operation is to be performed by the third execution engine, and wherein the third operation requires the second memory operation to be completed; and
generating a third set of program code including an instruction for performing the second memory operation and instructions for performing the third operation, wherein the third set of program code is generated without instructions for setting registers values or waiting on for register values to be set.

19. The computing system of claim 17, wherein the non-transitory computer-readable medium further includes instructions that, when executed by the one or more processors, cause the one or more processors to perform operations including:
updating a fixed-size array, each index of the fixed-size array corresponding to an event register of the integrated circuit device, wherein values stored in the fixed-sized array indicate whether a respective event is available to be set by the set-event instruction.

20. The computing system of claim 17, wherein the non-transitory computer-readable medium further includes instructions that, when executed by the one or more processors, cause the one or more processors to perform operations including:
parsing sets of program code including the first set of program code and the second set of program code to identify sequences of set-event and wait-on-event instructions; and
identifying occurrences in the sequences of set-event and wait-on-event instructions where a particular set-event instruction is not followed by an instruction that clears a corresponding event register or is followed by more than one instruction that clears the corresponding event register.

21. The computing system of claim 17, wherein the non-transitory computer-readable medium further includes instructions that, when executed by the one or more processors, cause the one or more processors to perform operations including:
parsing sets of program code including the first set of program code and the second set of program code to verify that each execution engine of the integrated circuit device will reach a last instruction of a set of program code for the execution engine when the execution engine executes the respective set of program code.

* * * * *